(12) United States Patent
Vaglio (10) Patent No.: US 9,999,277 B2
(45) Date of Patent: Jun. 19, 2018

(54) SHOE SOLE AND INSOLE (71) Applicant: Jay Vaglio, Kansas City, KS (US)

(72) Inventor: Jay Vaglio, Kansas City, KS (US)

(*) Notice: Subject to any disclaimer, the term of this patent is extended or adjusted under 35 U.S.C. 154(b) by 488 days.

(21) Appl. No.: 14/218,120

(22) Filed: Mar. 18, 2014

(65) Prior Publication Data
US 2014/0259745 A1 Sep. 18, 2014

Related U.S. Application Data (60) Provisional application No. 61/801,389, filed on Mar. 15, 2013.

(51) Int. Cl.
| A43B 13/12 | (2006.01) |
| A43B 13/38 | (2006.01) |
| A43B 1/00 | (2006.01) |
| A43B 3/00 | (2006.01) |
| B29D 35/14 | (2010.01) |

(52) U.S. Cl.
CPC .......... *A43B 13/386* (2013.01); *A43B 1/0027* (2013.01); *A43B 3/0078* (2013.01); *A43B 13/12* (2013.01); *B29D 35/142* (2013.01); *Y10T 156/10* (2015.01)

(58) Field of Classification Search
CPC ....... A43B 13/22; A43B 13/386; A43B 13/04; A43B 13/122; A43B 13/12; A43B 13/125; A43B 13/127; A43B 1/0027; A43B 3/0078

USPC .................................................... 36/44, 59 R
See application file for complete search history.

(56) References Cited

U.S. PATENT DOCUMENTS

| 6,058,627 A * | 5/2000 | Violette ................. | A43C 15/14 36/59 R |
| 7,353,770 B2 * | 4/2008 | Sanguinetti .......... | A43B 1/0027 116/200 |
| 8,024,872 B2 * | 9/2011 | Pettis ..................... | A43B 13/22 36/132 |
| 2014/0215861 A1 * | 8/2014 | Burks ..................... | A43B 7/38 36/30 R |

FOREIGN PATENT DOCUMENTS

| EP | 1055377 A1 * | 11/2000 | ........... A43B 3/0078 |
| GB | 2411336 A * | 8/2005 | ........... A43B 1/0027 |

* cited by examiner

*Primary Examiner* — Ted Kavanaugh
(74) *Attorney, Agent, or Firm* — Law Office of Julie Scott LLC; Julie A. Scott (57) ABSTRACT

The present invention provides footwear sole systems and methods of making the footwear sole systems. The footwear sole systems comprise soles or insoles that are designed to provide an easy and simple means of measuring the wear of footwear and of providing other information, such as motivational messages, to a user.

7 Claims, 7 Drawing Sheets

SHOE SOLE AND INSOLE

RELATED APPLICATIONS

This application relates to and claims priority to U.S. Provisional Patent Application No. 61/801,389, which was filed Mar. 15, 2013 and is incorporated herein by reference in its entirety. All applications are commonly owned.

BACKGROUND OF THE INVENTION

A. Field of the Invention

The present invention relates to the manufacture and development of shoe soles and insoles that are composed of layers of different types and densities of materials.

B. Description of the Related Art

As physical activity becomes more important in our society's struggle with obesity, there is a need to establish new ways of motivating physical activity. And, as individuals become more physically active to become healthy, the materials that they use will need to be replaced more frequently. For example, a shoe is manufactured with only so much tread and material on the sole and insole, and therefore must be replaced after that tread or material has worn away. As avid runners can attest, sneakers or running shoes need to be replaced after a certain amount of use to maintain optimal performance and to prevent injury. This invention addresses a need to understand how much wear and use a shoe sole or insole has endured.

SUMMARY OF THE INVENTION

The present invention provides footwear systems, footwear sole systems, and methods of making footwear systems and footwear sole systems that overcome deficiencies in the art. Specifically, the systems provide an easy and simple means of measuring the wear of footwear and of providing other information, such as motivational messages, to a user of the footwear.

Footwear sole systems of the invention comprise a sole having two or more layers wherein a first sole layer has an outer bottom surface configured to contact a ground surface and an inner upper surface bonded to a bottommost surface of an inner sole layer and a second sole layer has a top surface configured to contact the bottom surface of a first insole layer and a bottom inner surface bonded to a topmost surface of an inner sole layer, wherein an inner sole layer is molded in a manner able to convey information when the bottom surface of the inner sole layer is exposed by degradation of the first sole layer; and an insole having two or more layers wherein the first insole layer has a top surface bonded to a bottommost surface of an inner insole layer, and a second insole layer has a top surface configured to contact a user's foot and bottom surface bonded to a topmost surface of an inner insole layer, wherein the topmost inner insole layer is molded in a manner such that information is conveyed to the user when the second insole layer is degraded by friction to expose the inner insole layer.

In some embodiments of footwear sole systems of the invention it is expected that there will be two or more inner sole layers present. In these systems, the upper and lower surfaces of the inner sole layers that are not in contact with either a first sole layer or a second sole layer will be in contact with an upper or lower surface of another inner sole layer. The upper and lower surfaces of inner sole layers that are in contact with each other are bonded to each other.

In some instances the inner sole layer and the second sole layer are the same layer.

Certain embodiments of footwear sole systems of the invention provide that there will be two or more inner insole layers present. In these systems, the upper and lower surfaces of the inner insole layers that are not in contact with either a first ininsole layer or a second sole layer will be in contact with an upper or lower surface of another inner insole layer. The upper and lower surfaces of inner insole layers that are in contact with each other are bonded to each other.

In some instances the inner insole layer and the first insole layer are the same layer.

Optionally, the first sole layer and inner sole layer(s) may have the same or different thicknesses or densities. Similarly, the first insole layer and inner insole layer(s) may have the same or different thicknesses or densities. It is envisioned that all layers of both the sole and insole may comprise either the same or different colors, textures, and types of materials. The selected makeup of materials, textures, thicknesses, densities, and other characteristics of any layer comprising a sole or insole of the invention is determined by the desired rate of degradation of a targeted layer. This rate of degradation will in part be determined by the type of information that it is desirable to convey to the user. For example, it may be desirable to convey a motivational message to encourage further physical activity more quickly than a message designed to indicate the amount of wear of a shoe. In the first instance, the composition of the layer to be degraded will be designed to cause a more rapid degradation than the rate of degradation of the target layer in the second instance.

The invention also provides for footwear systems that comprise a sole of a shoe. Such soles may be combined with an insole of the invention or another insole. Such a footwear system comprises a sole having two or more layers wherein a first layer has an outer bottom surface configured to contact a ground surface and an inner surface bonded to a bottommost surface of an inner layer, or a bottom surface of a second layer, or a combination thereof, wherein the second layer has an outer upper surface configured to contact the bottommost surface of an insole. And, the inner layer is molded in a manner able to convey information to a user when the bottom surface of the inner layer is exposed by degradation of the first layer. Further, the first layer of the first component is designed to degrade by friction at a controlled rate such that the inner layer is exposed after a desired amount of use of a shoe. Preferably, friction is generated by contact with the ground.

In some configurations of the invention, the inner layer of the sole is also the second layer of the sole.

The invention further provides for footwear systems that comprise an insole of a shoe. Such insoles may be combined with a sole of the invention or another sole. Such a footwear system comprises insole having two or more layers wherein a first layer has an outer upper surface configured to contact a foot and an inner bottom surface bonded to as uppermost surface of an inner layer, or an upper surface of a second layer, or a combination thereof, wherein the second layer has an outer bottom surface configured to contact the topmost surface of a sole, wherein the inner layer is molded in a manner able to convey information to a user when the upper surface of the inner layer is exposed by degradation of the first layer. The first layer of the insole is designed to degrade at a controlled rate by friction such that the inner layer is exposed after a desired amount of use of a shoe. Preferably, friction is generated by contact with the ground.

In some configurations of the invention, the inner layer of the insole is also the second layer of the insole.

Footwear systems of the invention also comprise a first component having two or more layers wherein a first layer has an outer bottom surface configured to contact a ground surface and an inner surface bonded to a bottommost surface of an inner layer, or a bottom surface of a second layer, or a combination thereof, wherein the second layer has an outer upper surface configured to contact the bottommost surface of a second component, wherein the inner layer is molded in a manner able to convey information to a user when the bottom surface of the inner layer is exposed by degradation of the first layer. The first layer of the first component is designed to degrade by friction at a controlled rate such that the inner layer is exposed after a desired amount of use of a shoe. Preferably, friction is generated by contact with the ground.

In some configurations of the invention, the inner layer of the first component is also the second layer of the first component.

The second component of footwear systems of the invention has two or more layers wherein a first layer has an outer upper surface configured to contact a foot and an inner bottom surface bonded to as uppermost surface of an inner layer, or an upper surface of a second layer, or a combination thereof, wherein the second layer has an outer bottom surface configured to contact the topmost surface of the first component, wherein the inner layer is molded in a manner able to convey information to a user when the upper surface of the inner layer is exposed by degradation of the first layer. The first layer of the second component is designed to degrade at a controlled rate by friction such that the inner layer is exposed after a desired amount of use of a shoe.

In footwear systems comprising a first component that contacts a ground surface and second component that contacts a foot, the first component is a sole, and the second component is an insole.

Footwear systems of the invention also comprise a first component having two or more layers wherein a first layer has an outer upper surface configured to contact a foot and an inner bottom surface bonded to an uppermost surface of an inner layer, or an upper surface of a second layer, or a combination thereof, wherein the second layer has an outer bottom surface configured to contact the topmost surface of a second component, wherein the inner layer is molded in a manner able to convey information to a user when the upper surface of the inner layer is exposed by degradation of the first layer. The first layer is designed to degrade at a controlled rate by friction such that the inner layer is exposed after a desired amount of use of a shoe. Preferably, friction is generated by contact with the foot.

In some configurations of the invention, the inner layer of the first component is also the second layer of the first component.

The second component of footwear systems of the invention also has two or more layers wherein a first layer has an outer bottom surface configured to contact a ground surface and an inner surface bonded to a bottommost surface of an inner layer, or a bottom surface of a second layer, or a combination thereof, wherein the second layer has an outer upper surface configured to contact the bottommost surface of the first component, wherein the inner layer is molded in a manner able to convey information to a user when the bottom surface of the inner layer is exposed by degradation of the first layer. The first layer of the second component is designed to degrade at a controlled rate by friction such that the inner layer is exposed after a desired amount of use of a shoe.

In footwear systems comprising a first component that contacts a foot and second component that contacts a ground surface, the first component is an insole, and the second component is a sole.

The invention also provides methods of making the claimed footwear sole systems. A first method of the invention comprises the steps of making a sole having multiple layers by pouring a first liquid into a first mold and allowing the first liquid to form a first layer, adding a second liquid on top of the first layer and allowing the second liquid to form a second layer that bonds to the first layer, wherein the first layer is allowed to solidify sufficiently prior the addition of further material to prevent disruptive admixing between layers; making an insole having multiple layers by pouring a first liquid into a second mold and allowing the first liquid to form a first layer, adding a second liquid on top of the first layer and allowing the second liquid to form a second layer that bonds to the first layer, wherein the first layer is allowed to solidify sufficiently prior the addition of further material to prevent disruptive admixing between layers; and combining the solidified sole with the solidified insole to form the footwear sole system.

Some methods of making footwear sole systems of the invention comprise the addition of one or more additional layers to the sole by repeating the steps used to form the first and second sole layers. Similarly, some methods of making footwear sole systems of the invention comprise the addition of one or more additional layers to the insole by repeating the steps used to form the first and second insole layers.

In some embodiments, the methods of making footwear sole systems of the invention further comprise placing one or more removable molds on top of the first sole layer such that one or more portions of the first sole layer are covered and the second liquid cannot bond to the first layer in the covered areas. It is expected that removable molds may be in the shape of a graphic, symbol, text, or combination thereof such that upon degradation of the target sole layer, the desired information can be conveyed by the pattern caused by the removable mold(s).

Similarly, the methods of making footwear sole systems of the invention may further comprise placing one or more removable molds on top of the first insole layer such that one or more portions of the first insole layer are covered and the second liquid cannot bond to the first layer in the covered areas. The removable molds may be in the shape of a graphic, symbol, text, or combination thereof such that upon degradation of the target sole layer, the desired information can be conveyed by the pattern caused by the removable mold(s).

Another method of making the footwear sole systems of the invention comprises the use of a pressure mold in combination with heat, adhesive(s), or another appropriate bonding agent(s). The method comprises the steps of making a sole having multiple layers by placing a first preformed sole layer and a second preformed sole layer in a pressure mold; adding heat or adhesive to the pressure mold and operating the pressure mold to press the first preformed sole layer and second preformed sole layer together with sufficient pressure to bond the first and second preformed sole layers to each other; making an insole having multiple layers by placing a first preformed insole layer and a second preformed insole layer in a pressure mold; adding heat or adhesive to the pressure mold and operating the pressure mold to press the first preformed insole layer and second preformed insole layer together with sufficient pressure to bond the first and second preformed insole layers to each other; and combining the pressed sole with the pressed insole to form the footwear sole system. Additional sole layers and insole layers may be added by repeating the described, appropriate steps.

Herein, the terms sneaker, running shoe, athletic shoe, and the like are used interchangeably to refer to footwear or shoes. The invention is not limited to use in sneakers, running shoes, or athletic shoes. The invention is suitable for use in any type of footwear for which it is desirable to track or measure the wear or degradation of the sole or insole.

The manufacture of shoes using rubber, rubber-like, plastics, and other materials are well known in the art. It is expected that manufacture of the present invention can be accomplished by adapting present manufacturing techniques to use the modifications exemplified herein without undue experimentation.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

The invention provides a sole and an insole for a shoe. Both the sole and insole are made of multiple layers that wear or degrade at different rates such that wear patterns can be discerned. The wear patterns provide different types of information to a user. For example, a motivational message or graphic may be revealed by wear, or the wear pattern may indicate that footwear needs to be replaced. By developing the shoe sole and insole in layers of material having different densities and thicknesses, a different layer of information/color/feedback can be exposed as material is worn away at different rates.

The present invention also relates to the manufacture and development of shoe soles and insoles. More specifically, the invention relates to the manufacture and development of soles and insoles that are composed of layers of materials. Preferably, the soles and insoles of the invention are composed of different types and densities of materials. The material of the shoe is manufactured in layers of color, graphics, etc. to provide subsequent feedback to an owner, runner, shoe user, etc.

As the sole and insole of the shoe encounters friction, the makeup of the sole and insole changes due to the wearing away of material. This degradation of the sole and insole provides an indication of the portion(s) that have endured the most and least wear. The invention takes advantage of this pattern of wear or degradation to communicate information. For example, information about the physical state of the shoe or a motivational message can communicated to the user.

The advantages of the present invention include, without limitation, that it is able to degrade the material of the sole or insole in a controlled manner that tracks the areas of contact with either the ground or foot, respectively, and provides a means of quantifying the amount of material degraded due to the quantity of contact.

Figure 1:
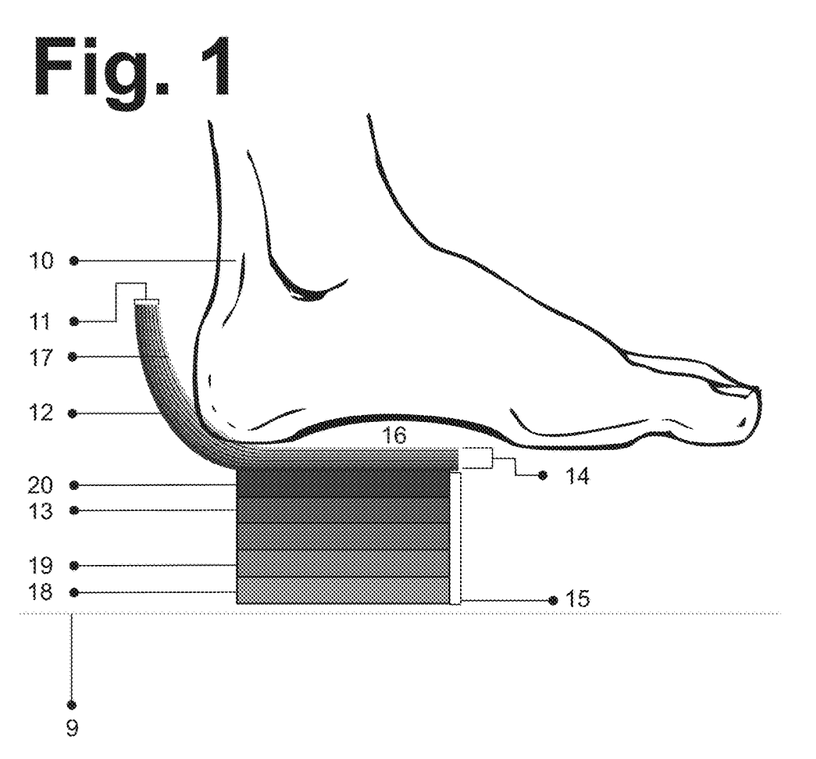
FIG. 1. A diagram showing a side-view of a foot inside a shoe. The diagram of the shoe shows an expanded view of the layering of a sole and insole. The diagram illustrates the rear portion of the sole and insole and is not to scale.

Referring now to the invention in more detail, FIG. 1 shows a foot 10 that is inside the shoe. The foot 10 represents the person using the shoe. The foot 10 is in contact with the insole 11 of the shoe. The insole 11 of the shoe has two or more (i.e. multiple) layers of material 14 that can come in contact with the foot 10. The friction between the foot 10 and the insole 11 causes the top most layer of material 16 to degrade or wear away from the insole 11. After degradation of this layer 16 of the insole 11, the next layer of material 17 of the insole 11 will come in contact with the foot 10. Similarly, this next layer of material 17 can be degraded by friction with the foot 10 to expose another layer of the insole 11. Subsequent layers of the insole 11 can continue to degrade via friction with the foot 10 until the outer layer 12 of the insole 11 is exposed. Over time, degradation of a layer may be partial or even complete.

In further detail, still referring FIG. 1, the outer layer 12 of the insole 11 transitions from the insole 11 to the sole 15. That is, it is desirable that the outer layer 12 of the insole 11 is in contact with the topmost layer 20 of the sole 15. The sole 15 is constructed of two or more layers (i.e. multiple) of material and the outermost layer 18 is the one that initially comes in contact with the ground 9. Friction between the sole 15 and the ground 9 causes the outermost layer of material 18 to degrade or wear away from the sole 15. After degradation of this outermost layer 18 of the sole 15, the next layer of material 19 of the sole 15 will come in contact with the ground 9. Similarly, this next layer of material 19 can be degraded by friction with the ground 9 to expose one or more underlying layers of the sole 15, which can also be degraded via friction with the ground 9 until the uppermost layer 20 of the sole 15 is exposed. Over time, degradation of a layer may be partial or even complete.

The multiple layers 14 of the insole 11 continue the length of the foot 10. The multiple layers 14 can be composed of different materials such as rubber, plastics, and the like, and also of different colors and textures. These multiple layers 14 can also be composed of different densities or thicknesses of materials.

The multiple layers of the sole 15 also continue the length of the foot 10. The multiple layers can be composed of different materials such as rubber, plastics and the like, and also of different colors and textures. The multiple layers of materials can also be composed of different densities or thicknesses.

Both the multiple layers 14 of the insole 11 and multiple layers of the sole 15 can be developed or made using different manufacturing processes such as injection molding, heating and gluing, and the like. Those of skill in the art will be familiar with such processes and their suitability for use in the manufacture of insoles and soles for shoes.

Figure 2:
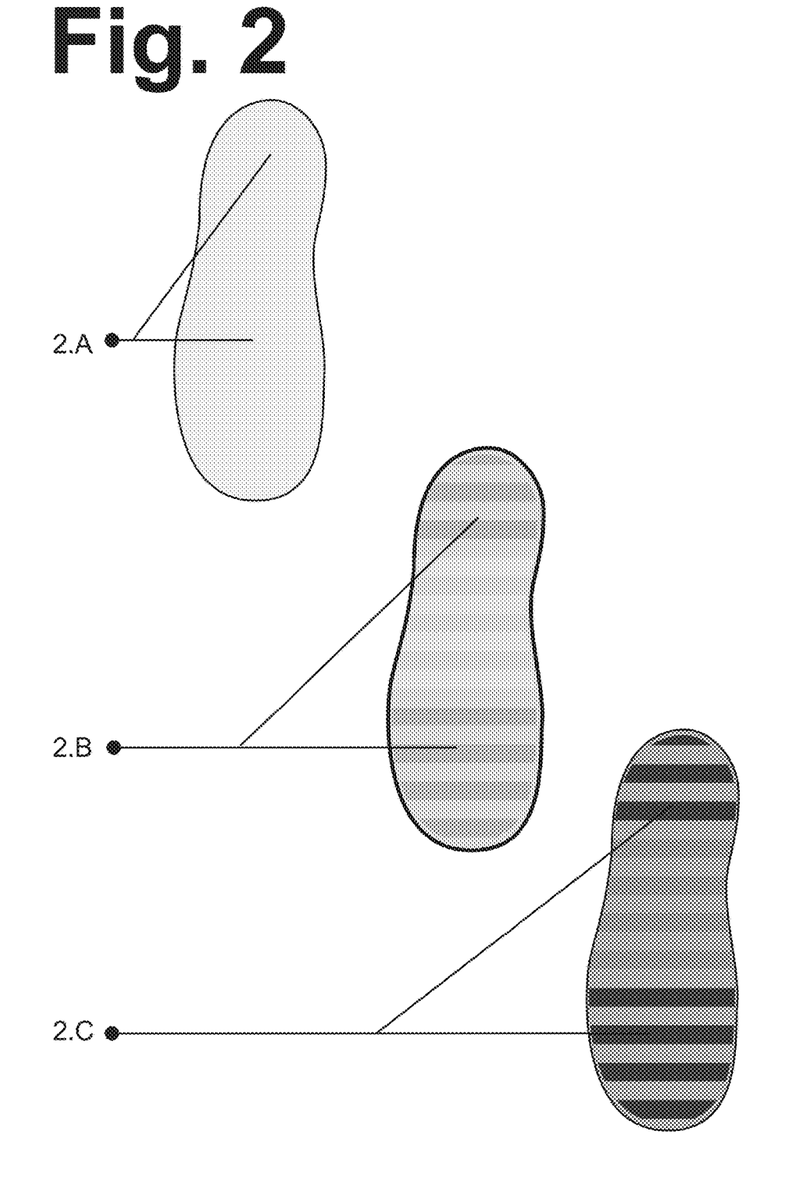
FIG. 2. A diagram showing the external layer of a sole or insole that is exposed to friction in three states of degradation.

FIG. 2 generally shows the wear or degradation of an insole or sole over time. In general, the areas corresponding to the heel and ball of a foot are exposed to a greater amount of friction as compared to a foot's instep area. For example, FIG. 2A represents the unworn, non-degraded state of the material of a sole or insole. FIG. 2B represents the initial wear down pattern (darker greys) of the sole or insole. The increasingly darker greys at areas corresponding to the ball and heel of the foot represent the areas of greater wear as compared to the area corresponding the middle of a foot (i.e. the instep area). FIG. 2C represents further wear of the sole or insole where the further darkening of the greys indicates further wear of the sole or insole.

The invention takes advantage of these areas of wear to utilize the exposed underlying layer(s) as a way to convey information. For example, the information may be motivational to encourage further physical activity by a child or adult, or the information may provide data about the physical state of the shoe and its remaining usable life. The exposed underlying layer(s) may comprise one or more different colors, graphic symbols, or words that can be used to provide information.

Figure 3:
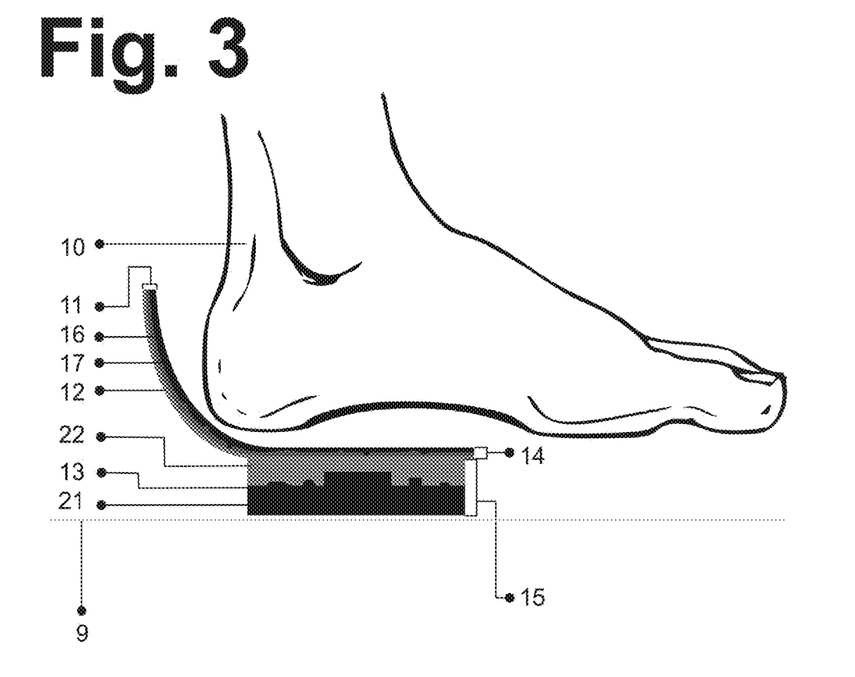
FIG. 3. A diagram showing a side-view of a foot inside a shoe and showing the rear portion of a sole and insole. The diagram of the shoe illustrates the layering of the sole and insole and is not necessarily to scale.

Another configuration of the invention is shown in FIG. 3. FIG. 3 shows a foot 10 that is inside a shoe and is in contact with the insole 11 of the shoe. The insole 11 of the shoe has two or more (i.e. multiple) layers of material 14. The friction between the foot 10 and the insole 11 causes the topmost layer of material 16 to degrade or wear away from the insole 11. After degradation of this uppermost layer 16 of the insole 11, the next or second layer of material 17 of the insole 11 will be exposed and come into contact with the foot 10. Similarly, this second layer of material 17 can be degraded by friction with the foot 10 to expose a further layer beneath the second layer 17. Subsequent layers of the insole 11 can continue to degrade via friction with the foot 10 until the outermost layer 12 of the insole 11 is exposed to the foot 10. Over time, degradation of any layer may be partial or even complete.

In FIG. 3, the outer layer 12 of the insole 11 transitions from the insole 11 to the sole 15. That is, it is desirable that the outer layer 12 of the insole 11 is in contact with the topmost layer 22 of the sole 15. The sole 15 is constructed of two or more layers (i.e. multiple) of material such that the outermost layer 21 is the one that initially comes in contact with the ground 9. These multiple layers of the sole 15 may be similar in thickness and shape to each other as illustrated in FIG. 2, or they may vary in thickness or shape as represented in FIG. 3.

Friction between the sole 15 and the ground 9 causes the outermost layer of material 21 to degrade or wear away from the sole 15. After degradation of this outermost layer 21 of the sole 15, the next layer of material 22 of the sole 15 will be exposed and come in contact with the ground 9. Similarly, this next layer of material 22 can be degraded by friction with the ground 9 to expose one or more further underlying layers of the sole 15. Subsequent layers of the sole 15 can continue to degrade via friction with the ground 9 until the uppermost layer 22 of the sole 15 is exposed. Over time, degradation of a layer may be partial or even complete.

In FIG. 3 the multiple layers 14 of the insole 11 continue the length of the foot 10. The multiple layers 14 can be composed of different materials such as rubber, plastics, and the like, and also of different colors and textures. These multiple layers 14 can also be composed of different densities or thicknesses of materials. The multiple layers of the sole 15 also continue the length of the foot 10. The multiple layers can be composed of different materials such as rubber, plastics and the like, and also of different colors and textures. The multiple layers of materials can also be composed of different densities or thicknesses.

Both the multiple layers 14 of the insole 11 and multiple layers of the sole 15 can be developed or made using different manufacturing processes such as injection molding, heating and gluing, and the like. Those of skill in the art will be familiar with such processes.

Figure 4:
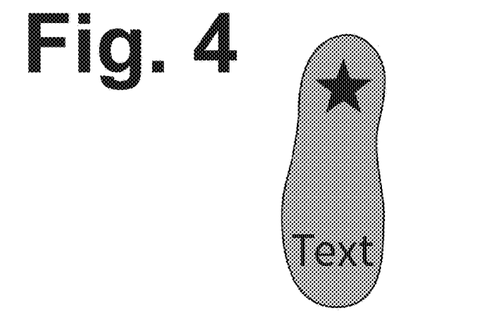
FIG. 4. A diagram showing an insole from the top view, or alternatively a sole from the bottom view, in one state of degradation such that portions of the first external layer have worn away to show information an underlying layer. The information is represented by a star ( ) and TEXT.
Figure 5:
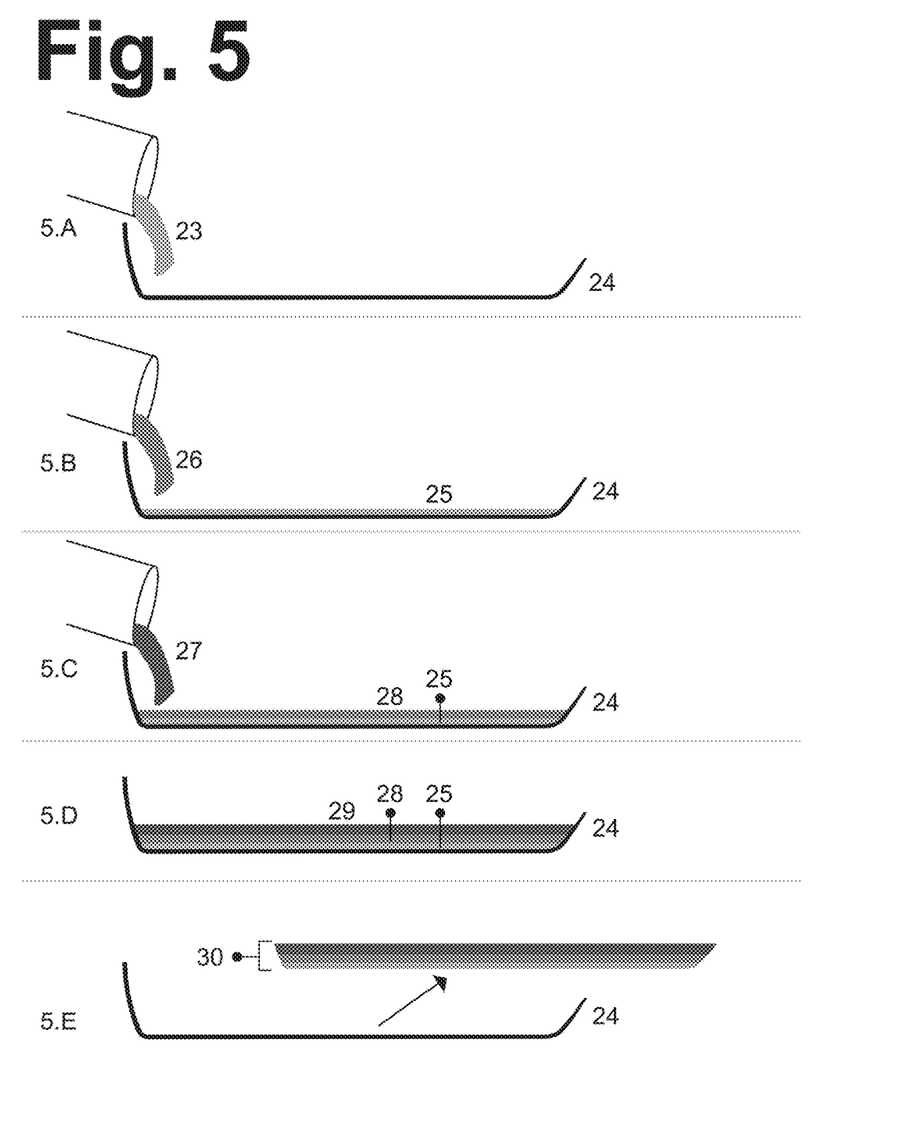
FIG. 5. Representation of a method of making either an insole or sole using a single mold.

FIG. 4 illustrates a sole, or alternatively an insole, that is at least partially worn such that portions of a first external layer covering areas of the heel and ball of the foot have worn away. The wear pattern exposes an underlying layer that is represented by the star ( ) in the heel and TEXT in the ball of the foot and that comprises a graphic image, a symbol, or text that conveys information. The underlying layer that is exposed may include any type, style, color, pattern, image, or combination thereof that conveys information.

FIGS. 5-8 describe different methods of making insoles and soles of the invention. Specifically, FIG. 5A shows a first liquid 23 (light grey) that will form a first layer being poured into a mold 24. FIG. 5B shows a second liquid 26 (medium grey) that will form a second layer being poured into the mold 24 on top of the first layer 25. FIG. 5C shows a third liquid 27 (dark grey) that will form a third layer being poured on top of the second layer 28. FIG. 5D shows three layers 25, 28, 29 in the mold 28. FIG. 5E shows the solidified insole or sole 30 removed from the mold 24. Preferably, each layer is allowed to solidify sufficiently before the next layer is poured to prevent disruptive admixing between the layers that would obscure the information that is to be conveyed through the use of the invention. Those of skill in the art will appreciate that, as desired, additional layers can be added.

Figure 6:
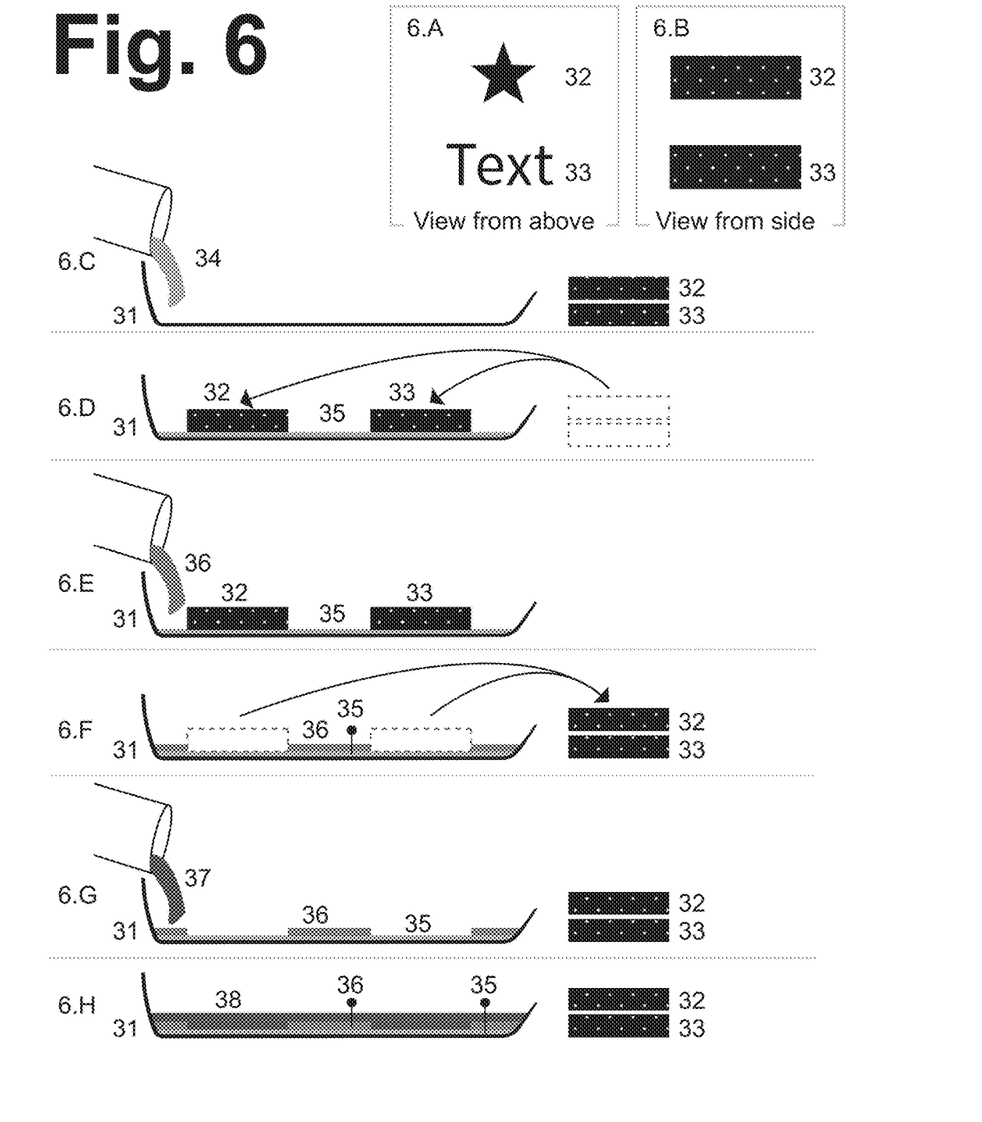
FIG. 6. Representation of a method of making either an insole or sole that uses multiple molds.

FIG. 6 illustrates the use of multiple molds to make a sole or insole having an underlying layer that comprises text, symbols, or graphics. Specifically, FIGS. 6A and 6B show a view from above and the side, respectively, of a first removable mold 32 and a second removable mold 33. FIG. 6C shows a first liquid 34 (light grey) that will form a first layer being poured into a mold 31. FIG. 6D illustrates the first removable mold 32 and second removable mold 33 placed on top of the first layer 35 such that portions of the surface of the first layer 35 are covered. FIG. 6E shows a second liquid 36 (medium grey), which is suitable for forming a second layer, being poured on top of the first layer 35. FIG. 6F shows a second layer 36 formed on top of the first layer 35. The second layer 36 is not present in the areas that were covered by the first removable mold 32 and the second removable mold 33. FIG. 6G shows a third liquid 37 (dark grey) being poured on top of the first layer 35 and the second layer 36 after the first removable mold 32 and second removable mold 33 have been removed. FIG. 6H shows a multi-layered insole or sole in the mold 31 having the third layer 38 in contact with both the first layer 35 and the second layer 36. Those of skill in the art will appreciate that, as desired, additional layers can be added.

Figure 7:
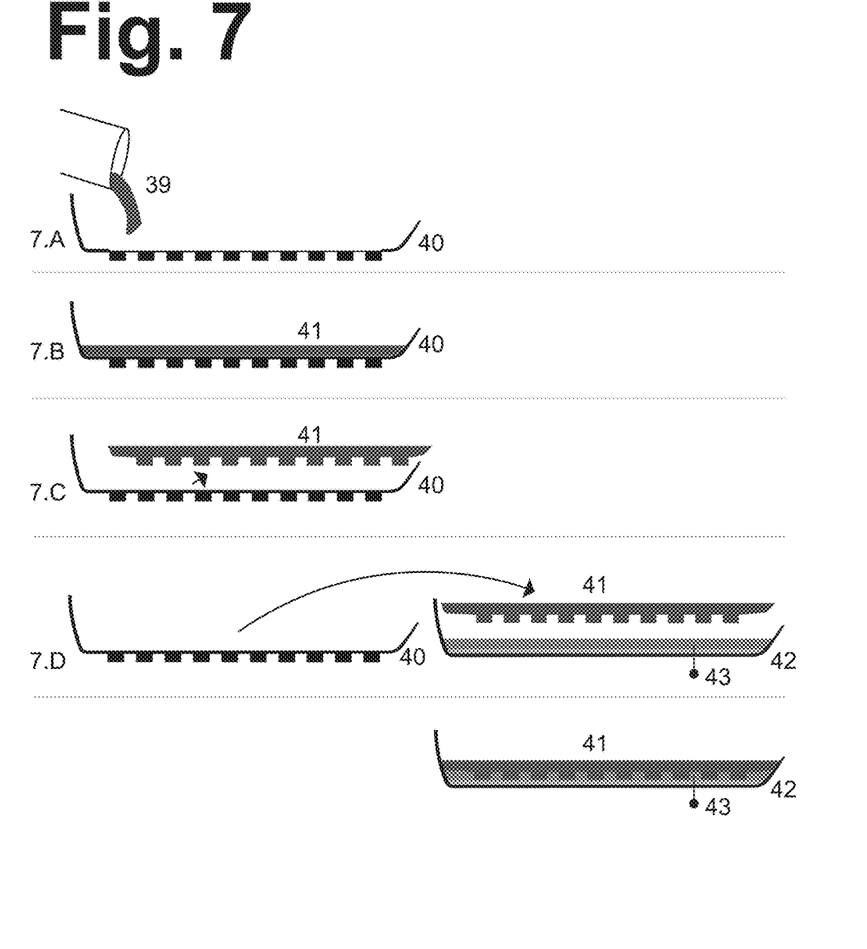
FIG. 7. Representation of another method of making either an insole or sole that uses multiple molds.

FIG. 7 shows an alternative method of forming a sole or insole. Specifically, FIG. 7A shows a first liquid 39 (dark grey) that will form a first layer being poured into a contoured mold 40. FIG. 7B shows a contoured layer 41 in the contoured mold 40, and FIG. 7C shows the contoured layer 41 removed from the contoured mold 40. FIG. 7D illustrates the contoured layer 41 being placed on top of a multi-layered bottom portion 43 (lighter greys), which has been formed in a separate mold 42, that is sufficiently malleable to allow the two to adhere or bond to each other and form an insole or sole having multiple layers of differing thicknesses.

Figure 8:
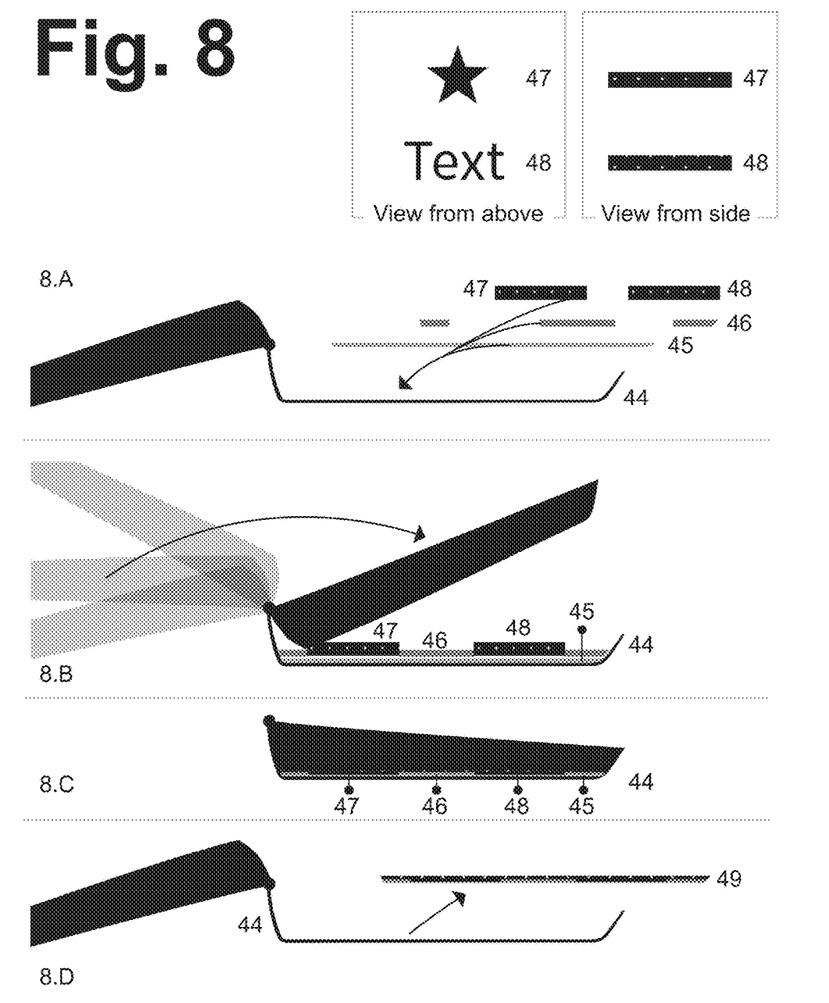
FIG. 8. Representation of a method of making either an insole or sole that combines the use of a mold and pressure.

FIG. 8 illustrates forming compositions of the invention by using pressure. Specifically, FIG. 8A shows a first preformed layer 45, a second preformed layer 46 that has two gaps, and a third preformed layer 47, 48, which comprises more than one type of information such as a graphic 47 and a text message 48, being placed into a pressure mold 44. FIGS. 8B and 8C illustrate the pressure mold 44 in operation to compress the layers together such that they bond together to form a composition of the invention 49 (i.e. a sole or insole) having layers of differing thicknesses. Those of skill in the art will recognize that pressure may be used in combination with heat, solvents, various adhesives, or other materials suitable for promoting the different layers to bond together such that they are not readily separated from each other by a means other than friction.

Unless defined otherwise, all technical and scientific terms used herein have the same meaning as is commonly understood by one of skill in the art to which this invention belongs at the time of filing. The meaning and scope of terms should be clear; however, in the event of any latent ambiguity, definitions provided herein take precedent over any dictionary or extrinsic definition. Further, unless otherwise required by context, singular terms shall include pluralities and plural terms shall include the singular. Herein, the use of "or" means "and/or" unless stated otherwise. Furthermore, the use of the term "including", as well as other forms such as "includes" and "included" is not limiting. Any patents and publications referred to herein are incorporated by reference.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention.

What is claimed is:

1. A footwear sole system for a shoe comprising
a) a sole having a bottom layer, at least one inner layer, and a top layer; and
b) an insole having a first layer, at least one inner layer, and a second layer,
wherein the bottom layer of the sole has an outer bottom surface configured to contact a ground surface and an inner upper surface bonded to a bottommost surface of the inner layer of the sole, and the top layer of the sole has a top surface configured to contact a bottom surface of the first layer of the insole and a bottom surface bonded to a topmost surface of the inner layer of the sole, and the inner layer of the sole includes a motivational message; and
wherein the first layer of the insole has a top surface bonded to a bottommost surface of the inner layer of the insole, and the second layer of the insole has a top surface configured to contact a user's foot and a bottom surface bonded to a topmost surface of the inner layer of the insole, wherein the inner layer of the insole includes another motivational message
wherein the motivational message of the sole is not exposed until a portion of the bottom layer is degraded by friction; and wherein the motivational message of the insole is not exposed until a portion of the second layer is degraded by friction.

2. The footwear sole system of claim 1, wherein the sole has two or more inner layers such that an upper surface of one of the inner layers of the sole is bonded to an adjacent lower surface of another inner layer of the sole.

3. The footwear sole system of claim 1, wherein the insole has two or more inner layers such that an upper surface of one of the inner layers of the insole is bonded to an adjacent lower surface of another inner layer of the insole.

4. The footwear sole system of claim 1, wherein the first sole layer and inner layer of the sole have different thicknesses or densities.

5. The footwear sole system of claim 1, wherein the first sole layer and inner layer of the sole have similar thicknesses or densities.

6. The footwear sole system of claim 1, wherein the first layer of the insole has a different thickness or density than the inner layer of the insole.

7. The footwear sole system of claim 1, wherein the first layer of the insole has a similar thickness or density to the inner layer of the insole.

* * * * *